US006177157B1

(12) United States Patent
Cota

(10) Patent No.: US 6,177,157 B1
(45) Date of Patent: Jan. 23, 2001

(54) THERMAL SHIELD

(76) Inventor: Donald Cota, 3 Carroll Blvd., St. Johnsbury, VT (US) 05819

( * ) Notice: Under 35 U.S.C. 154(b), the term of this patent shall be extended for 0 days.

(21) Appl. No.: 09/183,756
(22) Filed: Oct. 30, 1998
(51) Int. Cl.[7] .............................. B32B 1/02; B32B 3/04
(52) U.S. Cl. .............................. 428/34.1; 428/57; 428/76; 428/124; 428/126; 428/130; 220/619
(58) Field of Search .............................. 428/57, 76, 124, 428/126, 34.1, 69, 130; 220/689, 619, 620

(56) References Cited

U.S. PATENT DOCUMENTS

| | | | | |
|---|---|---|---|---|
| 490,579 | | 1/1893 | Miller . | |
| 583,683 | | 6/1897 | Gersant et al. . | |
| 1,699,434 | | 1/1929 | Jordan . | |
| 1,891,452 | | 12/1932 | Schibsted . | |
| 2,576,698 | | 11/1951 | Russum | 154/28 |
| 2,969,166 | * | 1/1961 | Henchert | 220/619 |
| 3,921,848 | | 11/1975 | Dolveck | 220/67 |
| 4,131,980 | | 1/1979 | Zinnbauer | 29/463 |
| 4,392,295 | | 7/1983 | Sasai et al. | 29/509 |
| 5,398,407 | | 3/1995 | Stuer | 29/890 |
| 5,591,505 | * | 1/1997 | Rusek et al. | 428/69 |
| 5,953,808 | | 9/1999 | Schenck Jr. et al. | 29/509 |

* cited by examiner

*Primary Examiner*—Alexander Thomas
(74) *Attorney, Agent, or Firm*—Downs Rachlin & Martin PLLC

(57) ABSTRACT

A thermal shield (20) having a first plate (22) and a second plate (24) with an interior chamber (26) positioned in between. The thermal shield includes a seam (40) extending around the periphery thereof which prevents the ingress of fluid into the interior chamber. The seam includes portions (60 and 72) that extend at least partially, and preferably completely, around the outer surface (56) of a shoulder (54) of the seam. In this regard, seam 40 is capable of sealing a pressure differential between the interior chamber and the regions surrounding the thermal shield of up to about 40 psi.

9 Claims, 4 Drawing Sheets

THERMAL SHIELD

FIELD OF THE INVENTION

The present invention pertains to thermal shields and, more particularly, to multi-layer thermal shields having a peripheral seal for limiting the ingress of fluids into the interior of the thermal shield.

BACKGROUND OF THE INVENTION

As the automotive industry has moved toward cleaner and more fuel-efficient products, engine compartments have become packed with engines that run hotter, with materials that absorb less heat (aluminum vs. steel), and with materials that deform or melt when exposed to excessive heat. In addition, other portions of automobiles include components that generate significant heat, e.g., catalytic heaters. To address this problem, simple metal stampings have been positioned between the heat source and the component to be protected. As more components are packed into less space, heat generation has increased to the point (e.g., over 1300° F. at a catalytic converter) where more sophisticated thermal shields are required. Additionally, as automobile manufacturers continuously strive to reduce noise within the passenger compartment of automobiles they produce, simple stampings, with their tendency to vibrate, are inadequate for many applications.

To address these concerns, composite thermal shields are now in widespread use. These thermal shields function by reflecting, deflecting, dispersing and/or absorbing heat. Generally, these thermal shields include an insulating material, e.g., fiberglass, ceramic, aramid or air, that is typically encapsulated by upper and lower plates made from stainless steel, aluminum or other materials of varying grades and thicknesses. Such composite thermal shields are described, for example, in U.S. Pat. Nos. 2,576,698 and 5,398,407. Factors such as size and temperature of the heat source, air flow, ambient temperature and the required temperature on the cool side of the shield, are considered in designing composite thermal shields and typically necessitate an application-specific design.

Known composite thermal shields suffer from a number of problems. First, the seam at the periphery of the thermal shield used to secure together the upper and lower plates, which is generally formed by folding together peripheral portions of the plates, is typically not waterproof. As a result water can enter the interior of the thermal shield. The presence of water in the thermal shield reduces insulting properties, and can lead to corrosion, thereby reducing the durability of the thermal shield. Furthermore, the peripheral seams of known thermal shields are often wrinkled and cracked which renders them less desirable to consumers and in extreme cases necessitates scrapping the part. In addition, such known peripheral seams are often sharp, causing safety issues in the workplace.

Another problem with known composite thermal shields is that they are relatively costly to manufacture. The seams of known thermal shields could be made waterproof by welding, through the use of adhesives or by other techniques. However, the additional manufacturing steps associated with these processes would add further to the cost of producing a thermal shield, which is already often higher than is desired.

SUMMARY OF THE INVENTION

One aspect of the present invention is a thermal shield comprising a first plate having a first peripheral region, a second plate having a second peripheral region and an interior chamber between said first plate and said second plate. In addition the thermal shield has a seam including (i) a first portion of the first peripheral region and a first portion of the second peripheral region, wherein the first portions extend outwardly relative to the interior chamber; (ii) a second portion of the first peripheral region and a second portion of the second peripheral region, wherein the second portions extend inwardly relative to the interior chamber; (iii) a shoulder connecting the first portion and said second portion of the first peripheral region, the shoulder having an outermost surface as determined relative to the interior chamber; (iv) a third portion of the first peripheral region and a third portion of the second peripheral region, wherein the third portions extend outwardly relative to the interior chamber; and (v) a fourth portion of the first peripheral region and a fourth portion of the second peripheral region, wherein the fourth portions wrap at least partially around the outermost surface of the shoulder.

Another aspect of the present invention is a thermal shield comprising a first plate having a first peripheral edge, a second plate having a second peripheral edge and an interior chamber enclosed by the first plate and the second plate. The thermal shield also includes a seam made exclusively from the first peripheral edge and the second peripheral edge, wherein the seam seals the interior chamber such that fluids cannot travel between the interior chamber and the region surrounding the thermal shield unless there is a pressure differential between the interior chamber and the region of at least 10 psi.

Yet another aspect of the present invention is a method of making a thermal shield comprising the steps of providing a first plate having a first peripheral region and a second plate having a second peripheral region. Next, the first plate is positioned relative to the second plate so that the first peripheral region is positioned adjacent the second peripheral region and so that first portions of the first and second peripheral regions extend in a first direction. Then, second portions of the first and second peripheral regions are folded so as to extend in a second direction which is substantially opposite the first direction, whereby a shoulder is formed between the first and second portions of the first peripheral region. As the next step, third portions of the first and second peripheral regions are folded so as to extend in the first direction. Finally, fourth portions of the first and second peripheral regions are folded so as to wrap at least partially around the shoulder.

DETAILED DESCRIPTION OF THE INVENTION

Figure 1:
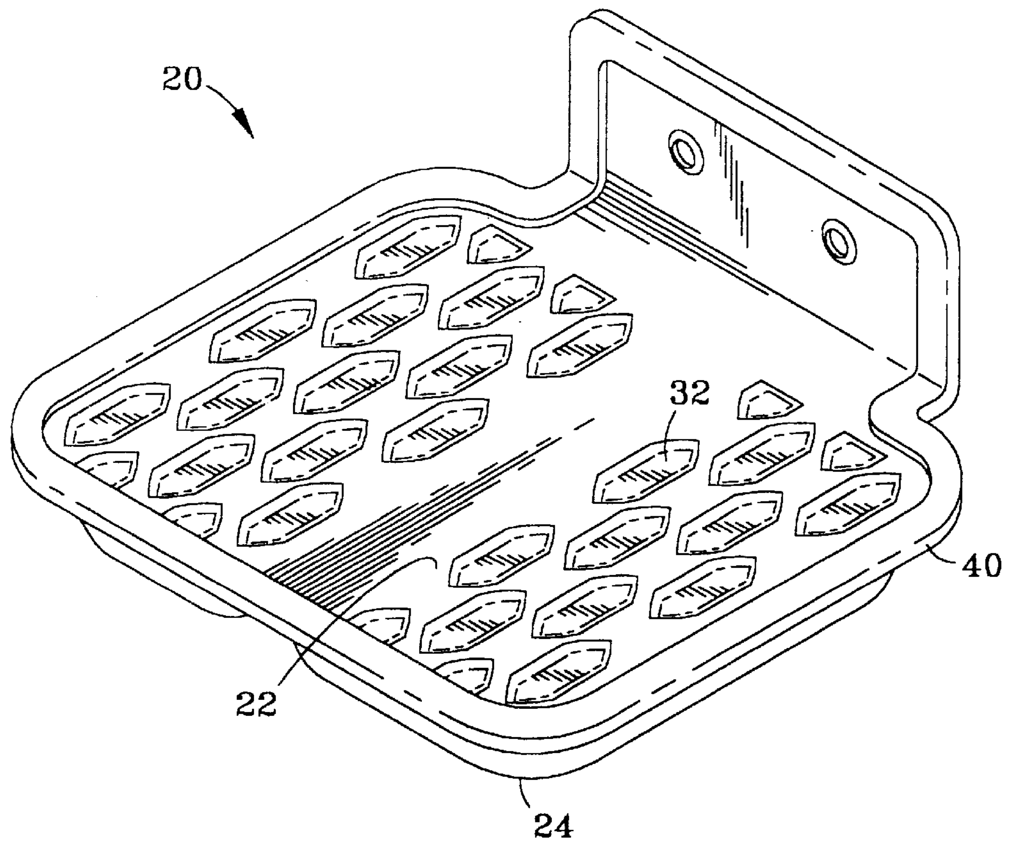
FIG. 1 is a perspective view of the thermal shield of the present invention.
Figure 2:
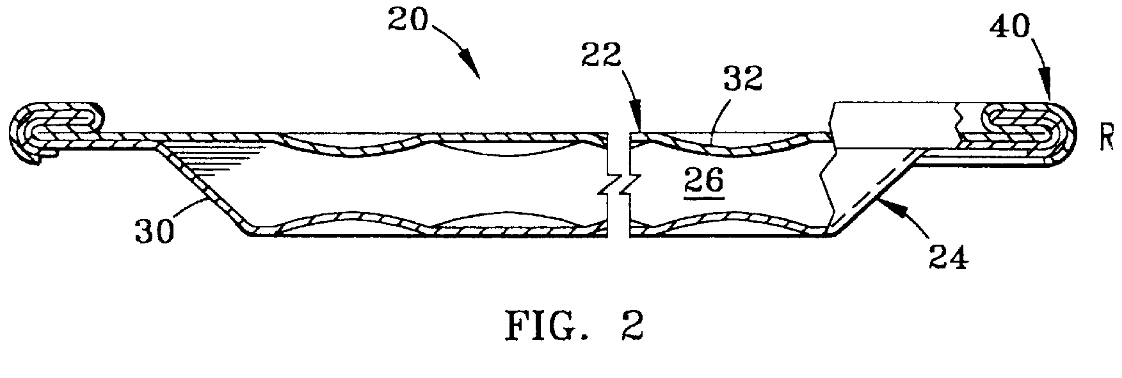
FIG. 2 is a cross-sectional view of the thermal shield of FIG. 1, taken along line 2—2.

Referring to FIGS. 1 and 2, the present invention is a thermal shield 20 including a first plate 22 and a second plate 24. An interior chamber 26 is provided between first plate 22 and second plate 26. Interior chamber 26 is preferably filled with air or other gas, but alternatively may contain fiberglass, ceramics, aramids or other insulating materials.

As illustrated in FIG. 2, interior chamber 26 is provided by forming a recessed section 30 in second plate 24. Alternatively, interior chamber may be provided by forming a similar recessed section (not shown) in first plate 22, or by forming recessed sections in both first plate 22 and second plate 24 which together constitute interior chamber 26.

First plate 22 and second plate 24 may be made from a range of materials, but are preferably made from corrosion-resistant materials such as aluminum or stainless steel. The thicknesses of plates 22 and 24 will vary depending upon the intended application, as those skilled in the art will appreciate. However, the thicknesses of first plate 22 and second plate 24 typically range from 76.2 microns (0.003 inch) to 2.3 millimeters (0.09 inch).

The overall configuration of thermal shield 20 will vary as a function of the environment in which it is intended to be used. Thus, the configuration of the thermal shield illustrated in FIGS. 1 and 2 is only exemplary.

To reduce flexure of first plate 22 and second plate 24, in some cases it may be desirable to provide a plurality of dimples 32 in one or both of the first and second plates. While dimples 32 are illustrated in FIGS. 1 and 2 as recessed structures, i.e., they extend into interior chamber 26, they may alternatively be projecting structures, i.e., extend away from the interior chamber.

Figure 3:
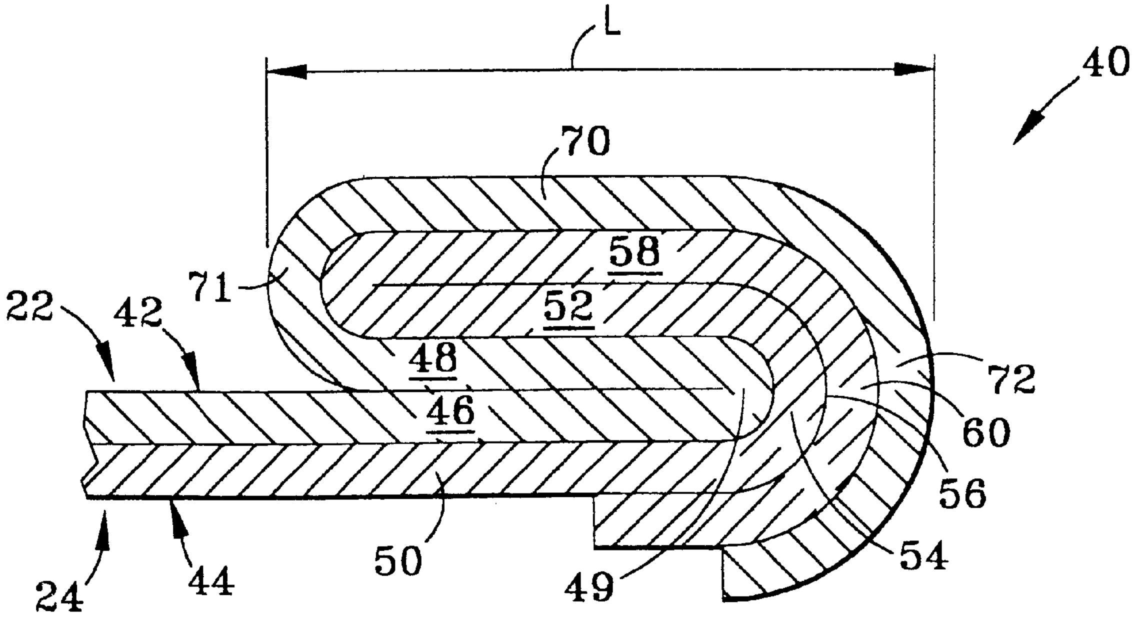
FIG. 3 is an enlarged cross-sectional view of the seam of the thermal shield of FIG. 1.

Referring now to FIGS. 1–3, an important aspect of the present invention is seam 40 which extends around the periphery of thermal shield 20. Seam 40 is designed to secure together first plate 22 and second plate 24 and provide a seal that blocks the flow of fluid between interior chamber 26 and region R surrounding thermal shield 20. More specifically, seam 40 is designed to prevent the transfer of fluid between interior chamber 26 and region R when the pressure differential between the interior chamber and the region is up to 40 psi. The extent of the pressure differential sealable by seam 40 will depend upon thicknesses of first plate 22 and second plate 24, and the specific size and configuration of seam 40, as discussed in more detail below. Seam 40 provides a sealing capability without the use of adhesives, welding or other materials and/or techniques for securing together first plate 22 and second plate 24. Of course, other materials incidental to the manufacturing process may be present within seam 40, e.g., oil or grease.

Describing the construction of seam 40 in more detail, the seam is made from first peripheral region 42 of first plate 22 and a second peripheral portion 44 of second plate 24. Seam 40 includes a first portion 46 of first peripheral region 42, which first portion extends outwardly relative to interior chamber 26. Seam 40 also includes a second portion 48 of first peripheral portion 42, which second portion is folded so as to extend inwardly relative to interior chamber 26. Second portion 48 also preferably extends substantially parallel to and is in contact with first portion 46. First portion 46 and second portion 48 join at shoulder 49.

In addition, seam 40 includes first portion 50 of second peripheral region 44, which first portion extends outwardly relative to interior chamber 26 and preferably contacts and extends substantially parallel to first portion 46 of first peripheral region 42. Seam 40 also includes second portion 52 of second peripheral region 44. Second portion 52 extends inwardly relative to interior chamber 26, and preferably extends substantially parallel to and contacts second portion 48 of first peripheral region 42. First portion 50 and second portion 52 join at shoulder 54 having an outermost (with respect to interior chamber 26) surface 56. Shoulder 54 wraps around shoulder 49 and is outward of shoulder 49 relative to interior chamber 26. Seam 40 further includes third portion 58 of second peripheral region 44, which third portion extends outwardly relative to interior chamber 26 and preferably extends substantially parallel to and contacts second portion 52. Seam 40 also includes fourth portion 60 of second peripheral region 44. Fourth portion 60 extends at least partially around shoulder 54, outwardly of the shoulder, and preferably extends entirely around the shoulder, as illustrated in FIG. 3, so as to terminate in contact with first portion 50.

An additional component of seam 40 is third portion 70 of first peripheral region 42, which third portion extends outwardly relative to interior chamber 26 and preferably extends parallel to and in contact with third portion 58. Third portion 70 is connected to second portion 48 via shoulder 71, with second portion 52 and third portion 58 being positioned between second portion 48 and third portion 70. Finally, seam 40 includes fourth portion 72 of first peripheral region 42. Fourth portion 72 wraps at least partially around outer surface 56 of shoulder 54, with fourth portion 60 being positioned between fourth position 72 and outer surface 56. Preferably, fourth portion 72 wraps entirely around outer surface 56 of shoulder 54, as illustrated in FIG. 3.

As noted above, it is preferred that first portion 46 contact and extend parallel to first portion 50, second portion 48 contact and extend to first portion 46, second portion 52 contact and extend parallel to second portion 48, third portion 58 contact and extend parallel to second portion 52 and third portion 70 contact and extend parallel to third portion 58. However, the present invention encompasses some limited amount of deviation from such contacting and parallel relationship.

The length of first portion 46, second portion 48, third portion 70, fourth portion 72, first portion 50, second portion 52, third portion 58 and fourth portion 60 may vary relatively widely as a function of the thickness of first peripheral region 42 and second peripheral region 44, the extent of sealing action required and other parameters known to those skilled in the art. In an exemplary embodiment of the present invention in which first plate 22 and second plate 24 are made from aluminum and first peripheral region 42 and second peripheral region 44 have a thickness of 0.40 millimeters (0.016 inch) the overall length L of seam 40 is about 4.75 millimeters (0.1875 inch).

Figure 4:
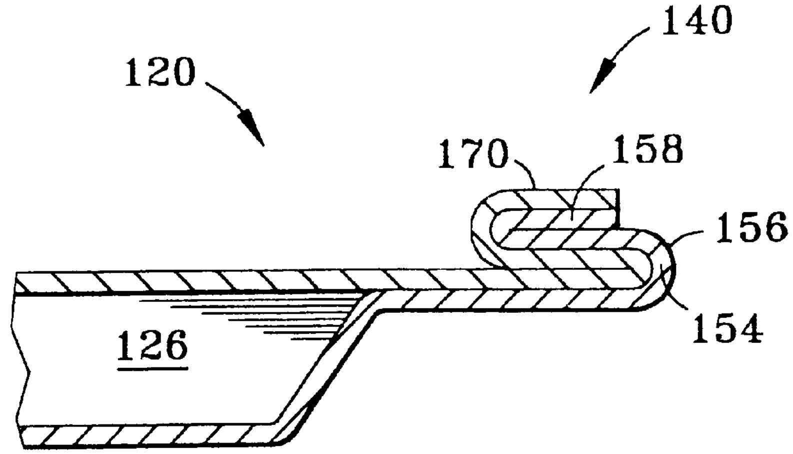
FIG. 4 PRIOR ART
FIG. 4 is an enlarged cross-sectional view of the seam of a prior art thermal shield.

Referring to FIGS. 3 and 4, the provision of fourth portions 60 and 72 which wrap at least partially around outer surface 56 of shoulder 54 constitute an important aspect of seam 40. By contrast, with reference to FIG. 4, seam 140 of prior art thermal shield 120 lacks structure analogous to fourth portions 60 and 72. In FIG. 4, components of seam 140 that are identical to seam 40 are identically numbered except that a 100's series prefix is added. Thus, in 30 seam 140, third portions 158 and 170 terminate significantly inward (with respect to interior chamber 126) of outer surface 156 of shoulder 154. The absence of structure analogous to fourth portions 60 and 72 significantly adversely impacts the sealing capability of prior art seal 140. Indeed, it is believed that prior art seal 140 is incapable of blocking the transfer of fluids between interior chamber 126 and the regions surrounding prior art thermal shield 120 when the pressure differential between the low pressure side of seam 40, (e.g., the side of the seam closest to interior chamber) and the high pressure side of seam 40 is in excess of about 5 psi. Furthermore, the absence of structure analogous to fourth portions 60 and 72 results in a seam 140 that is often unsightly and can be sufficiently sharp to create hazards in the work place and in final application.

Figure 5A:
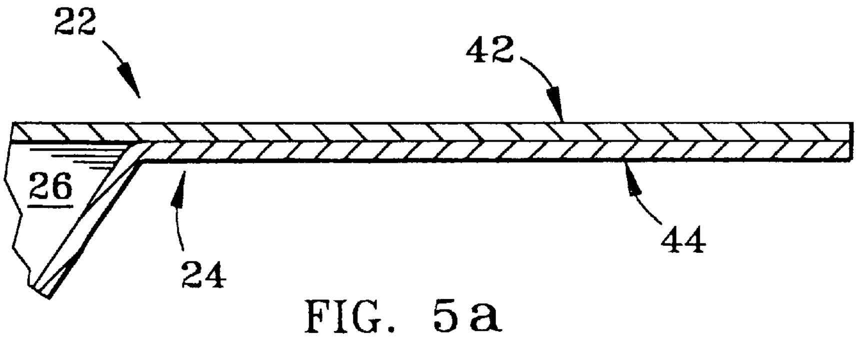
FIGS. 5*a*–5*f* are partial cross-sectional views of the thermal shield of the present invention illustrating the manufacturing steps involved in forming the seam of the thermal shield.
Figure 5B:
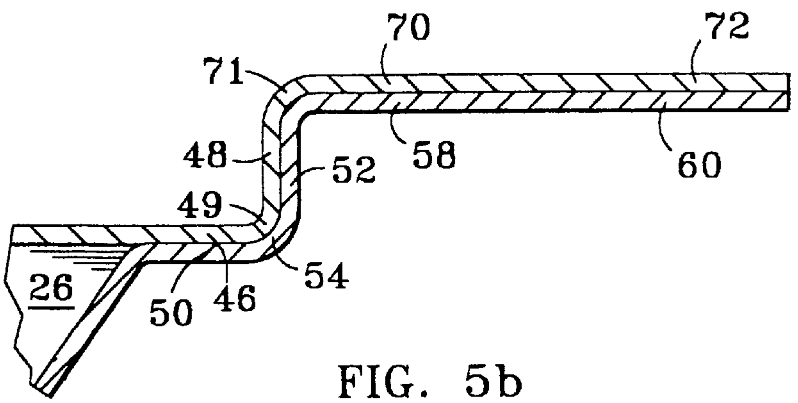

Referring now to FIGS. 5*a*–5*f*, the method of forming seam 40 will be described. Before formation of seam 40, first plate 22 and second plate 24 are brought into contact with one another so that respective first peripheral region 42 and second peripheral region 44 contact one another, as illustrated in FIG. 5*a*. Then, as illustrated in FIG. 5*b*, first peripheral region 42 and second peripheral region 44 are folded at shoulders 49 and 54 so that second portion 48 and second portion 52 extend perpendicular to first portion 46 and first portion 50, respectively. This folding operation along with other folding operations described below is achieved using conventional tools and techniques known to those skilled in the art. In addition, third portion 58 and fourth portion 72 are folded so as to extend perpendicular to second portions 48 and 52 and parallel, but spaced from, first portions 46 and 50. At this stage, first portion 58 and second portion 60 are typically coplanar, as are third portion 70 and fourth portion 72.

Figure 5C:
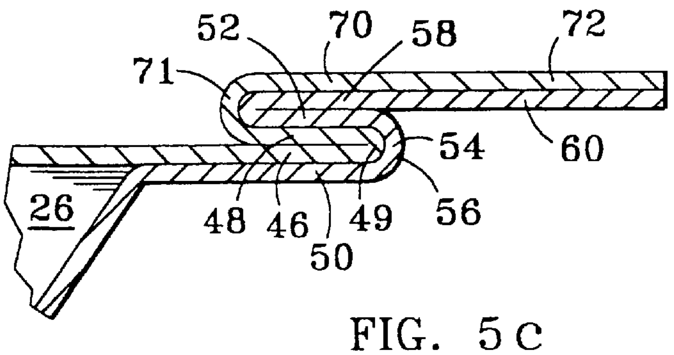
Figure 5D:
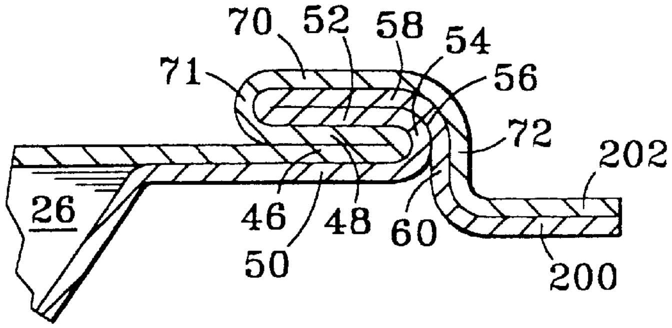

Next, as illustrated in FIG. 5*c*, second portions 48 and 52 are folded toward interior chamber 26 so as to extend substantially parallel to first portions 46 and 50, respectively, and so that second portion 48 preferably contacts first portion 46. As part of this operation, third portions 58 and 70 are also folded so as to extend substantially parallel to second portions 48 and 52, with second portion 52 preferably contacting third portion 58. Thereafter, as illustrated in FIG. 5*d*, fourth portions 60 and 72 are folded partially around outer surface 56 of shoulder 54, with what will become excess material 200 and 202 attached, respectively, to ends of portions fourth 60 and 72 extending outwardly with respect to interior chamber 26, preferably substantially parallel to first portion 50.

Figure 5E:
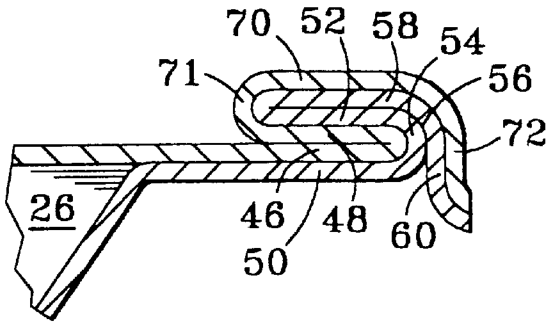

Then, as illustrated in FIG. 5*e*, excess material 200 and 202 is cut off of fourth portions 60 and 72, respectively, using conventional blanking techniques.

Figure 5F:
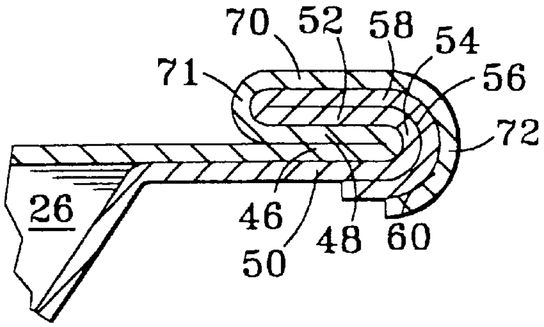

Finally, as illustrated in FIG. 5*f*, the outermost ends of fourth portions 60 and 72 are folded at least partially, and preferably completely, as illustrated in FIG. 5*f*, around outer surface 56 of shoulder 54. In this regard, it is typically more important for fourth portion 60 to wrap completely around outer surface 56 than fourth portion 72. However, the present invention encompasses wrapping either or both of fourth portions 60 and 72 completely around, or at least partially, around outer surface 56. This completes the formation of seam 40.

An important advantage of thermal shield 20 of the present invention is that it may be used in environments in which water is present, e.g., underneath an automobile adjacent a catalytic converter, without accumulating moisture within interior chamber 26. The fact that seam 40 is substantially waterproof increases longevity of the thermal shield by reducing the possibility of corrosion driven by water present in interior chamber 26. Another advantage of thermal shield 20 with seam 40 having the configuration described above is that the overall appearance of the thermal shield is more aesthetically pleasing. In addition, seam 40 of the construction described above is safer because it does not contain sharp edges.

What is claimed is:

1. A thermal shield comprising:

a. a first plate having a first peripheral region;

b. a second plate having a second peripheral region;

c. an interior chamber between said first plate and said second plate; and d. a seam including:

i. a first portion of said first peripheral region and a first portion of said second peripheral region, wherein said first portions extend outwardly relative to said interior chamber;

ii. a second portion of said first peripheral region and a second portion of said second peripheral region, wherein said second portions extend inwardly relative to said interior chamber;

iii. a shoulder connecting said first portion and said second portion of said first peripheral region, said shoulder having an outermost surface as determined relative to said interior chamber;

iv. a third portion of said first peripheral region and a third portion of said second peripheral region, wherein said third portions extend outwardly relative to said interior chamber; and v. a fourth portion of said first peripheral region and a fourth portion of said second peripheral region, wherein said fourth portions wrap at least partially around said outermost surface of said shoulder.

2. A thermal shield according to claim 1, wherein said seam extends around the entire thermal shield.

3. A thermal shield according to claim 1, wherein said fourth portion of said first peripheral region and said fourth portion of said second peripheral region wrap completely around said outermost surface of said shoulder.

4. A thermal shield according to claim 1, wherein said first, second and third portions of said first peripheral region extend in mutually parallel relationship and said first, second and third portions of said second peripheral region extend in mutually parallel relationship.

5. A thermal shield according to claim 4, wherein said first and second portions of said second peripheral region contact one another and said second and third portions of said first peripheral region contact one another.

6. A thermal shield according to claim 1, wherein at least one of said first plate and said second plate includes a plurality of dimples.

7. A thermal shield according to claim 1, wherein said seam is capable of blocking the passage of fluid from a low pressure side of said seam to a high pressure side of said seam where the pressure differential between said low pressure side and said high pressure side is at least 10 psi.

8. A thermal shield according to claim 7, wherein said pressure differential is at least 25 psi.

9. A thermal shield according to claim 1, wherein said interior chamber is filled with air.

* * * * *